United States Patent [19]

Yamashita et al.

[11] Patent Number: 5,838,601
[45] Date of Patent: Nov. 17, 1998

[54] ARITHMETIC PROCESSING METHOD AND ARITHMETIC PROCESSING DEVICE

[75] Inventors: Hideo Yamashita; Yuji Yoshida, both of Kawasaki, Japan

[73] Assignee: Fujitsu Limited, Kawasaki, Japan

[21] Appl. No.: 674,514

[22] Filed: Jul. 2, 1996

[30] Foreign Application Priority Data

Feb. 14, 1996 [JP] Japan .................................. 8-027103

[51] Int. Cl.⁶ ....................................................... G06F 7/38
[52] U.S. Cl. ............................................................ 364/748
[58] Field of Search ..................................... 364/748, 200, 364/736.5, 745; 395/182.13, 650, 375

[56] References Cited

U.S. PATENT DOCUMENTS

| | | | |
|---|---|---|---|
| 4,777,593 | 10/1988 | Yoshida ................................. | 364/200 |
| 4,791,555 | 12/1988 | Garcia et al. ......................... | 364/200 |
| 4,949,241 | 8/1990 | Iwasaki et al. ....................... | 364/200 |
| 5,003,462 | 3/1991 | Blaner et al. ......................... | 364/200 |
| 5,043,867 | 8/1991 | Bhandarkar et al. ................. | 364/200 |
| 5,113,521 | 5/1992 | McKeen et al. ...................... | 395/650 |
| 5,341,482 | 8/1994 | Cutler et al. ......................... | 395/375 |
| 5,588,113 | 12/1996 | Johnson ............................. | 395/182.13 |

FOREIGN PATENT DOCUMENTS

| | | |
|---|---|---|
| 61-160134 | 7/1986 | Japan . |
| 2-71326 | 3/1990 | Japan . |
| 6-290023 | 10/1994 | Japan . |

*Primary Examiner*—Reba I. Elmore
*Assistant Examiner*—Monica Lewis
*Attorney, Agent, or Firm*—Armstrong, Westerman, Hattori, McLeland and Naughton

[57] ABSTRACT

An arithmetic processing method and arithmetic processing device each which can reduce the number of logical stages needed to obtain the final arithmetic result, thus executing an arithmetic process such as a floating-point multiplication at high speed to reduce the arithmetic process time. According to the arithmetic processing method and arithmetic processing device, the possibility that an arithmetic exception occurs in the arithmetic result obtained through an arithmetic process is judged in the middle of the arithmetic process of the dedicated arithmetic processing unit. Transmitting an arithmetic end signal to the instruction control unit is inhibited when it is judged that there is a possibility; the arithmetic process with the possibility is executed by means of another arithmetic unit different from the dedicated arithmetic unit. Thereafter the arithmetic end signal regarding the arithmetic process is transmitted to the instruction control unit. The arithmetic processing method and arithmetic processing device can be applied to the case where an arithmetic process such as a floating-point arithmetic operation is performed in a pipeline mode.

8 Claims, 7 Drawing Sheets

30A: ARITHMETIC PROCESSING UNIT

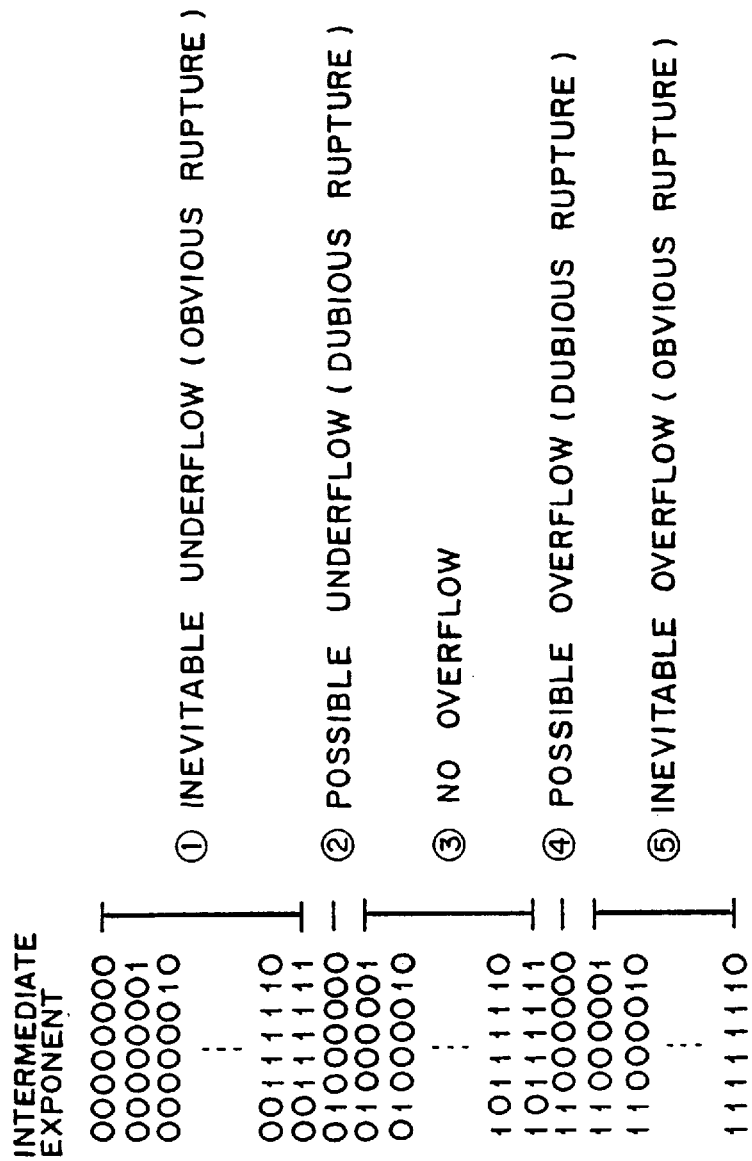

ARITHMETIC PROCESSING METHOD AND ARITHMETIC PROCESSING DEVICE

BACKGROUND OF THE INVENTION

1) Field of the Invention

The present invention relates to an arithmetic processing method and arithmetic processing device each which performs an arithmetic operation in a pipeline mode. Particularly, the present invention relates to an arithmetic processing method and arithmetic processing device each suitable for a floating-point arithmetic operation.

2) Description of the Related Art

Recently, the increase in the processing speed of information processing devices as well as the increase in the number of gates mounted on a single LSI chip are remarkable. The arithmetic operations with high accuracy by means of the information processing device have been increasingly demanded for scientific and engineering computation, computer graphics plotting computation, simulation, and others. In order to perform such a high-accuracy computation, it has been desired that the processing speed of the floating-point arithmetic processing device or the like is further speeded up.

Generally, the information processing device, as shown in FIG. 5, includes an instruction control unit (I unit) 1, a memory control unit (S unit), and an arithmetic processing unit (E unit) 3. The arithmetic processing unit 3 includes an operand register 3a, an arithmetic executing unit 3b, and a result register 3c.

In the arithmetic processing unit 3 of the information processing device, when the operand register 3a is set in response to the instruction code of an instruction to be executed from the instruction control unit 1 and operand data from the instruction control unit 1 or the memory control unit 2, the arithmetic executing unit 3b executes the arithmetic operation of the operand data held in the operand register 3a in a pipeline mode, according to the instruction code. The operation result is written in the result register 3c.

The arithmetic processing unit 3 reports the completion of an arithmetic operation to the instruction control unit 1 by transmitting the operation result written into the result register 3c to the instruction control unit 1 or the memory control unit 2 while(transmitting an arithmetic end signal (an end notice signal of an arithmetic operation) to the instruction control unit 1.) When recognizing the arithmetic completion of the arithmetic processing unit 3 according to the arithmetic end signal, the instruction control unit 1 enters the next instruction process to the arithmetic processing unit 3.

Generally speaking, in order to execute efficiently the pipeline control in the sophisticated pipeline mode, the arithmetic processing unit 3 uses a process end notice signal as an arithmetic end signal. The arithmetic processing unit 3 transmits an arithmetic end notice signal as an arithmetic end signal to the instruction control unit 1 in the final cycle of the arithmetic operation.

In order to execute a floating-point arithmetic operation by means of the above-mentioned information processing device, (the arithmetic processing unit 3 generally performs an exponent part arithmetic operation and a mantissa part arithmetic operation according to instructions and corrects the intermediate result of the exponent part using the result of the mantissa part arithmetic operation, thus obtaining the final result. The interrupt may occur according to the arithmetic result.)

FIG. 6 illustrates a floating-point data format. As shown in FIG. 6, the floating-point data has a length of 8-byte. The significant bit represents a sign part (s) (sign; + or −). The next 7-bit-with-no-sign binary integer represents an exponent part (e). The further next 56-bit hexadecimal number represents a mantissa part (m). That is, it is handled that a floating point is just on the left side of the mantissa part (m) (or just on the position of the eighth-bit).

The exponent part (e) in a 7-bit length can represent up to "0 to 127". The negative exponents can be realized by relating the exponent part (e) to "−64 to +63" (or +64-bias adjustment). That is, the exponent part (e) of the value 0 is represented by the bit expression of "1000000". The actual value R of the floating-point data shown in FIG. 6 is represented as the value "m×16$^e$" with the sign shown in the sign part s.

Next, the configuration of the floating-point multiplying unit 10 is as a general arithmetic processing unit in FIG. 7. The floating-point multiplying unit 10 corresponds to the arithmetic processing unit 3 shown in FIG. 5. The floating-point multiplying unit 10 consists of an operand registers 11-1 and 11-2, a sign arithmetic circuit 12, an input exponent correcting circuits 12-1 and 12-2, an intermediate exponent arithmetic circuit 13, a mantissa part normalizing circuits 14-1 and 14-2, a decoder 15, a CSA (Carry Save Adder) TREE circuit 16, a CPA (Carry Propagation Adder) circuit 17, a normalizing and judging circuit 18, a mantissa part correcting circuit 19, a final exponent arithmetic circuit 20, an interrupt processing circuit 21, and a result register 22.

The operand registers 11-1 and 11-2 each correspond to the operand register 3a shown in FIG. 5. Operands OP1 and OP2 each acting as a multiplicand or multiplier factor are respectively set to the operand registers 11-1 and 11-2.

The sign arithmetic circuit 12 calculates the (+ or −) sign of the result obtained by multiplying the operands OP1 by OP2, as the exclusive OR of the value of the sign part s1 in the operand OP1 and the value of the sign part s2 in the operand OP2.

The input exponent correcting circuit 12-1 normalizes and corrects the exponent part e1 of the operand OP1 and the input exponent correcting circuit 12-2 normalizes and corrects the exponent part e2 of the operand OP2.

The intermediate exponent arithmetic circuit 13 adds the exponent part e1 of the operand OP1 corrected by the input exponent correcting circuit 12-1 to the exponent part e2 of the operand OP2 corrected by the input exponent correcting circuit 12-2.

The mantissa part normalizing circuit 14-1 normalizes the mantissa part m1 of the operand OP1 and the mantissa part normalizing circuit 14-2 normalizes the mantissa part m2 of the operand OP2.

The decoder 15, CSA TREE circuit 16, and CPA circuit 17 are used to multiply the mantissa part m1 normalized by the mantissa part normalizing circuit 14-1 by mantissa part m2 normalized by the mantissa part normalizing circuit 14-2. This circuit configuration is well known. Hence the detail explanation in the configuration will be omitted here.

The decoder 15 decodes the input data (mantissa parts m1 and m2 normalized). The CSA TREE circuit 16 is formed by connecting the 3-input and 2-output CSAs (Carry Save Adders) in a TREE form. The CPA (Carry Propagation Adder) circuit 17 receives the output from the CSA TREE circuit 16 and then outputs the multiplied result (300) of the mantissa parts m1 and m2.

The normalizing and judging circuit 18 judges whether the multiplied result (300) of the mantissa parts m1 and m2 must be normalized in response to the CO (Carry Out) signal from the CPA circuit 17.

When the normalizing and judging circuit 18 judges that the normalization of the multiplied result (300) must be normalized, the mantissa part correcting circuit 19 normalizes the mantissa part multiplied result (300) from the CPA circuit 17 and outputs it as a final mantissa part M. The mantissa part correcting circuit 19 also corrects the mantissa part multiplied result (300) according to the instruction from the interrupt processing circuit 21, as described later, and then outputs the outcome as the final mantissa part M.

The final exponent arithmetic circuit 20 subtracts the bias adjustment component "64" from the intermediate exponent because the intermediate exponent being the addition result of two exponents e1 and e2 doubly includes the adjustment component "64", and further corrects with the normalization operation when the normalizing and judging circuit 18 judges that the normalization of the multiplied result (300) must be normalized (or when the mantissa part correcting circuit 19 normalizes the multiplied result (300). These functions allow the final exponent part E to be calculated and output.

When referring to the value of the final exponent part E from the final exponent arithmetic circuit 20 and thus recognizing the exponent underflow or resultant exponent overflow, the interrupt processing circuit 21 performs the interrupt process and the multiplied result correcting operation (to be described later).

The configuration which is formed of the sign arithmetic circuits 12, the input exponent correcting circuits 12-1 and 12-2 and the intermediate exponent arithmetic circuit 13, the mantissa part normalizing circuits 14-1 and 14-2, the decoder 15, the CSA TREE circuit 16, the CPA circuit 17, the normalizing and judging circuit 18, the mantissa part correcting circuit 19, the final exponent arithmetic circuit 20, and the interrupt processing circuit 21 corresponds to the arithmetic executing unit 3b shown in FIG. 5.

The result register 22 corresponds to the result register 3c shown in FIG. 5. The multiplied result (sign S, final exponent part E, and final mantissa part M) of operands OP1 and OP2 calculated by the portion corresponding to the arithmetic executing unit 3b are written into the result register 22.

Next, the operation of the floating-point multiplying unit 10 with the above configuration will be explained below.

The floating-point multiplication is performed by an addition of two exponent parts and a multiplication of two mantissa parts in two pieces of floating-point data.

That is, as the exponent arithmetic operation, the intermediate exponent arithmetic circuit 13 adds the exponent part e1 of the operand OP1 and the exponent part e2 of the operand OP2 after the normalizing process. The added result is handled as an intermediate exponent.

In the mantissa part operation, the mantissa part normalizing circuit 14-1 normalizes the mantissa part m1 of the operand OP1 and the mantissa part normalizing circuit 14-2 normalizes mantissa part m2 of the operand OP2. Then the combination of the decoder 15, the CSA TREE circuit 16 and the CPA circuit 17 multiplies the normalized mantissa part m1 by the normalized mantissa part m2. When the normalizing and judging circuit 18 judges that the multiplied result (300) must be normalized, the mantissa part correcting circuit 19 normalizes the multiplication result (300) and then outputs the final mantissa part M.

The final exponent arithmetic circuit 20 subtracts the bias component "64" from the intermediate exponent and corrects the intermediate exponent by the component when the mantissa part correcting circuit 19 normalizes the multiplied result (300), thus calculating the final exponent part E.

When the final exponent part E thus calculated is smaller than "0" and the final mantissa part unit M is not "0", the exponent underflow occurs. When the interrupt processing unit 21 detects the exponent underflow and the exponent underflow interruption is allowable to the instruction control unit 1 (refer to FIG. 5), the interrupt processing circuit 21 decides as the final arithmetic result the final mantissa part M from the mantissa part correcting circuit 19 while showing as the final exponent part E with a value larger than a correct value by "128". Then the interrupt processing circuit 21 ends the arithmetic operation and reports the interruption (310) to the instruction control unit 1.

When the exponent underflow interruption is not allowed, the interrupt processing circuit 21 writes as arithmetic results the arithmetic result formed of the sign part S of "0", the final exponent part E of "0" and the final mantissa part of "M" to register 22, without reporting the interruption (310) to the instruction control unit 1. In this time, the mantissa part correcting circuit 19 corrects the multiplied result (300) from the CPA circuit 17 to "0" and then outputs the outcome as the final mantissa part M to the result register 22. That is, since the multiplied result is nearly "0" in the exponent underflow state, it outputs "0" as a multiplied result without performing no interruption to the instruction control unit 1 and without allowing the exponent underflow interruption.

When the final exponent part E calculated by the final exponent arithmetic circuit 20 exceeds "127", the exponent overflow occurs. When the interrupt processing circuit 21 detects the exponent overflow, the interrupt processing circuit 21 finishes the arithmetic operation by showing a value as the final exponent part E smaller than a normal value by "128" and then reports the interruption (310) to the instruction control unit 1.

The sign arithmetic circuit 12 obtains the sign S of the multiplied result of the operands OP1 and OP2 being the exclusive logical sum of the value of the sign part s1 of the operand OP1 and the value of the sign part s2 of the operand OP2 and then writes the same to the result register 22.

The mantissa parts m1 and m2, as described above, are multiplied using the decoder 15, the CSA TREE circuit 16, the CPA circuit 17 and others each well-known. However, a considerable number of logic stages are needed to obtain the multiplied result. When the mantissa parts m1 and m2 each of 7 bytes normalized are multiplied, the multiplied result (300) becomes 14 bytes in length. However, in some input data pattern, the most significant digit of the multiplied result (300) becomes "0".

In this case, it is needed to normalize the mantissa part (multiplied result (300)) by the most significant digit (one digit). As to the exponent part, it is needed that the final exponent arithmetic circuit 20 subtracts 1 as the normalized component from the intermediate exponent and then outputs the final exponent part E.

The subtraction in the normalizing process may result in the final exponent part E smaller than "0", thus causing the exponent underflow (refer to (2) in FIG. 8). Even when the exponent overflow occurs in the intermediate exponent, the overflow may not occur by performing the subtraction by means of the final exponent arithmetic circuit 20 subtracts in the above-mentioned normalizing process including the above-mentioned normalization (refer to (4) in FIG. 8).

FIG. 8 is used for explaining the relationship between the intermediate exponent and the interrupt occurrence.

The intermediate exponent can be obtained by adding the exponent part e1 of 7 bits in length to the exponent part e2 of 7 bits in length. Hence when it is assumed that the exponent is 8-bit length data, the minimum value is "00000000" and the maximum value is "11111110".

As described above, the final exponent arithmetic circuit 20 may always subtract "010000000" (64 in hexadecimal number) being a bias adjustment component from the intermediate exponent and may further subtract "1" from the intermittent exponent, accompanying the normalization of the mantissa part (multiplied result (300)).

As shown in FIG. 8, the underflow occurs clearly in the range (1) of "00000000" to "00111111" of the intermediate exponent (OBVIOUS RUPTURE). The underflow may occur when the mantissa part (multiplied result (300)) is normalized in the range (2) of "01000000" of the intermediate exponent (DUBIOUS RUPTURE). The overflow or underflow never occurs in the range (3) of "01000001" to "10111111" of the intermediate exponent. The overflow may occur when the mantissa part (multiplied result (300)) is normalized in the range (4) of "11000000" of the intermediate exponent (DUBIOUS RUPTURE).

Furthermore, the overflow occurs obviously in the range (5) of "11000001" to "11111110" of the intermediate exponent (OBVIOUS PURPOSE).

In the floating-point multiplying device 10, as shown in FIG. 7, the series of logical operations (refer to the path A shown in FIG. 7), which includes the steps of judging whether the multiplied result (300) is normalized after the multiplication of the mantissa parts m1 and m2, obtaining the final exponent part E by correcting the intermediate exponent in the normalizing process, and correcting the mantissa part multiplied result (300) when the final exponent part E is in a underflow state and the underflow interruption is not allowable, is performed with the maximum number of logical stages.

Therefore, the delay value of the path with the maximum number of logic stages decides the processing rate of the whole multiplying device 10, thus resulting in disturbing the high-speed of the arithmetic process. The high accuracy is demanded for the arithmetic operation for scientific and engineering computation, computer graphics plotting computation, simulation, and others. In other words, it is desired to realize the high speed of the floating-point arithmetic operation. Particularly, it is desired to process the floating-point multiplication with a high occurrence frequency at high speed.

SUMMARY OF THE INVENTION

The present invention is made to overcome the above mentioned problems. An object of the present invention is to provide an arithmetic processing method which can reduce the number of logical stages used to obtain the final arithmetic result by noting the logic deciding the current arithmetic processing rate, whereby the improved speed of an arithmetic process such as a floating-point multiplication as well as the reduced arithmetic processing time can be realized.

Another object of the present invention is to provide an arithmetic processing device which can reduce the number of logical stages used to obtain the final arithmetic result by noting the logic deciding the current arithmetic processing rate, whereby the improved speed of an arithmetic process such as a floating-point multiplication as well as the reduced arithmetic processing time can be realized.

In order to achieve the above objects, according to the present invention, the arithmetic processing method in which a dedicated arithmetic unit executes an arithmetic process in a pipeline mode according to an arithmetic processing instruction from an instruction control unit and then transmits an end notice signal of the arithmetic process as an arithmetic end signal to the instruction control unit, is characterized by the steps of judging a possibility that an arithmetic exception occurs in the arithmetic result obtained through the arithmetic process in the middle of the arithmetic process of the dedicated arithmetic processing unit; inhibiting an arithmetic end signal from transmitting to the instruction control unit when it is judged that there is the possibility; executing said arithmetic process with the possibility by means of another arithmetic unit different from the dedicated arithmetic unit; and transmitting the arithmetic end signal regarding the arithmetic process to the instruction control unit.

Furthermore, according to the present invention, the arithmetic processing device is characterized by an instruction processing unit for issuing an arithmetic processing instruction; and an arithmetic processing unit for executing an arithmetic process in a pipeline mode according to an arithmetic processing instruction from the instruction processing unit; the arithmetic processing unit including a dedicated arithmetic unit for executing the arithmetic process, an arithmetic end posting unit for transmitting an end notice signal of the arithmetic process as an arithmetic end signal to the instruction control unit, a judging unit for judging the possibility that an arithmetic exception occurs an arithmetic result obtained by the arithmetic process in the middle of the arithmetic operation of the dedicated arithmetic unit, another arithmetic unit different from the dedicated arithmetic unit for executing the arithmetic process which is judged that there is the possibility by means of the judging unit, and inhibiting unit for inhibiting an arithmetic end signal from transmitting from the arithmetic end reporting unit to the instruction control unit till the another arithmetic unit completes the execution of the arithmetic process when the judging unit judges that there is the possibility.

As described above, according to the arithmetic processing method and arithmetic processing device, an arithmetic process with the possibility of the occurrence of an arithmetic exception is executed as another process in the middle of the arithmetic operation of the dedicated arithmetic unit so that the burden of the dedicated arithmetic unit can be reduced and the number of logic stages used to obtain the final arithmetic result can be reduced because of no need of waiting for the final arithmetic result. As a result, it is can be effectively realized the high-speed arithmetic process rate and the largely-reduced arithmetic process time.

BRIEF DESCRIPTION OF THE DRAWINGS

FIG. 8 is a diagram illustrating the relationship between an intermediate exponent and an interrupt occurrence.

DESCRIPTION OF THE PREFERRED EMBODIMENTS (a) Aspect of the Invention

Figure 1:
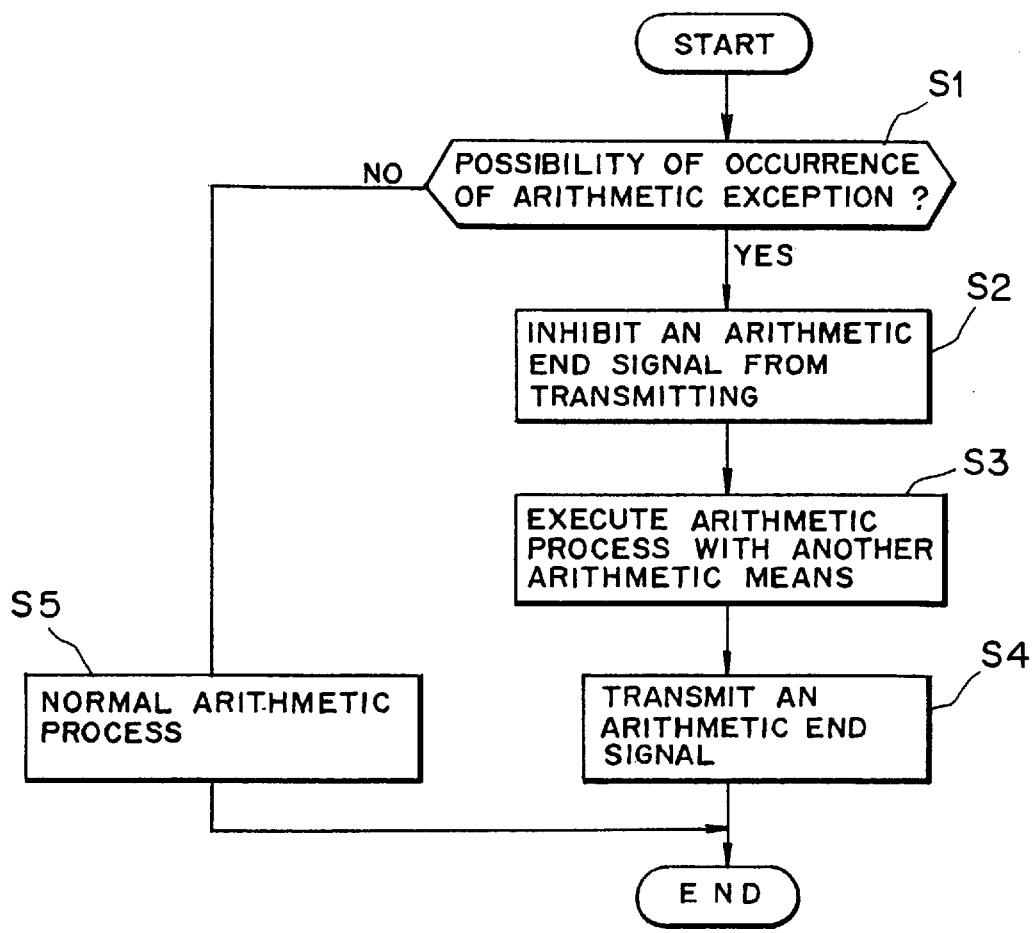
FIG. 1 is a diagram used for explaining an aspect of the present invention.

FIG. 1 is a diagram showing an aspect of the present invention. In the arithmetic processing method of the present invention, a dedicated arithmetic unit executes an arithmetic process in a pipeline mode and according to an arithmetic process instruction from the instruction control unit. Then the end notice signal of the arithmetic process is transmitted as an arithmetic end signal to the instruction control unit. As shown in FIG. 1, it is judged whether the arithmetic result obtained in the arithmetic process includes the possibility that an operation exception occurs in the middle of the arithmetic operation of the dedicated arithmetic unit (step S1).

When it is judged that there is the possibility (YES decision in step S1), the arithmetic end signal is inhibited from being transmitted to the instruction control unit (step S2). After an arithmetic unit different from the dedicated arithmetic unit executes the arithmetic process with the possibility (step S3), the arithmetic end signal regarding the arithmetic process transmits to the instruction control unit (step S4). However, when it is judged that there are no possibility in the step S1 (NO decision), the dedicated arithmetic unit executes the routine arithmetic process (step S5).

When an arithmetic exception occurs clearly in the middle of the arithmetic process, the arithmetic control corresponding to an occurrence of the operation exception may be performed immediately.

When the arithmetic process corresponds to a floating-point multiplying process, the possibility may be judged based on the intermediate exponent obtained by adding the exponent of a multiplier factor by the exponent of a multiplicand.

Figure 2:
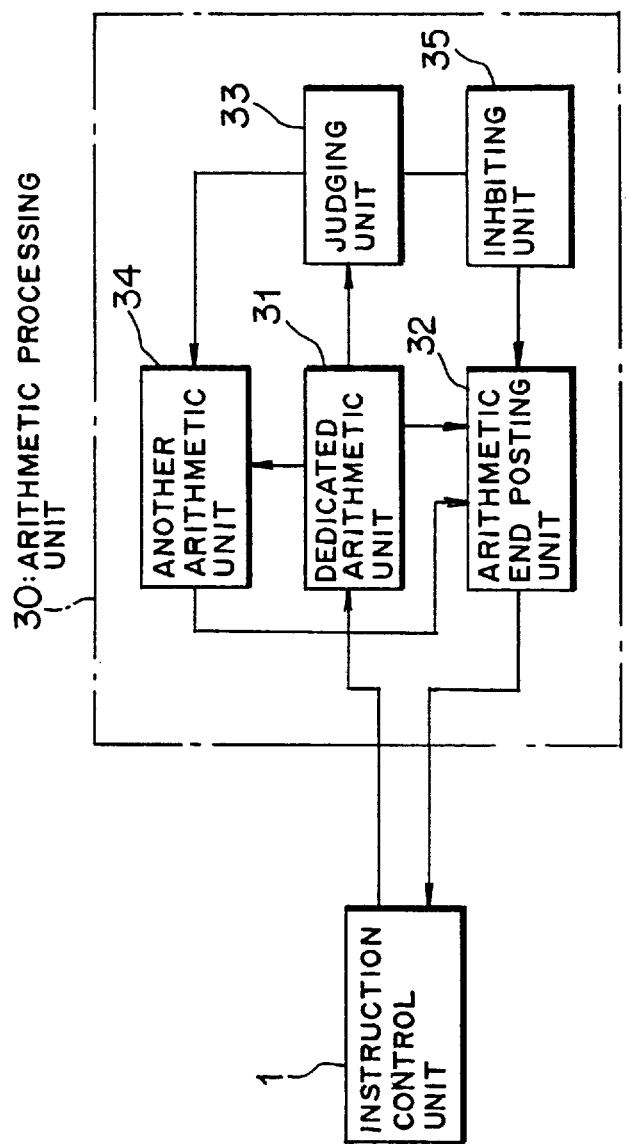
FIG. 2 is a block diagram showing an aspect of the present invention.

FIG. 2 is a block diagram illustrating an aspect of the present invention. Referring to FIG. 2, the arithmetic processing device according to the present invention consists of an instruction control unit 1 which issues an arithmetic process instruction and an arithmetic processing unit 30 which executes an arithmetic process in a pipeline mode and according to the arithmetic process instruction output from the instruction control unit 1.

The arithmetic processing unit 30 includes a dedicated arithmetic unit 31 which executes an arithmetic process, an arithmetic end posting unit 32 which transmits the arithmetic process end notice signal as an arithmetic end signal to the instruction control unit 1, a judging unit 33 which judges the possibility that the arithmetic result obtained through an arithmetic process includes an arithmetic exception, in the middle of the arithmetic process of the dedicated arithmetic unit 31, another arithmetic unit 34 different from the dedicated arithmetic unit which executes the arithmetic process that the judging unit 33 judges the presence of the possibility, and an inhibiting unit 35 which inhibits an arithmetic end signal from transmitting from the arithmetic end posting unit 32 to the instruction control unit 1 till the arithmetic unit 34 completes the arithmetic process.

The arithmetic processing unit 30 may include an arithmetic control unit that performs immediately an arithmetic control corresponding to an arithmetic exception when the judging unit 33 judges that the operation exception occurs in the middle of an arithmetic process.

Moreover, when an arithmetic process corresponds to a floating-point multiplying process, the judging unit 33 may judge the possibility based on the intermediate exponent obtained by adding the exponent of an multiplier factor by the exponent of a multiplicand.

As shown in FIG. 2, in the arithmetic processing device according to the present invention, the judging unit 33 can judge the possibility that an arithmetic exception occurs in the arithmetic result, in the middle of the arithmetic process of the dedicated arithmetic unit 31. When the judging unit 33 judges that there is the possibility, the inhibiting unit 35 inhibits an arithmetic end signal from transmitting from the arithmetic end posting unit 32 to the controlling unit 1.

The arithmetic process judged that there is the possibility is executed by means of the dedicated arithmetic unit 31 and another arithmetic unit 34. At the end of the arithmetic process, the arithmetic end reporting unit 32 transmits an arithmetic end signal to the instruction control unit 1.

In the arithmetic processing method and the arithmetic processing device, since the arithmetic process having the possibility of an arithmetic exception is executed in another process (arithmetic unit 34) in the middle of the arithmetic operation of the dedicated arithmetic unit 31, the load of the dedicated arithmetic unit 31 can be released. Furthermore, it is unnecessary to wait for the final arithmetic result so that the number of logic stages used to obtain the final arithmetic result can be reduced.

When it is judged that an arithmetic exception occurs in the middle of an arithmetic process, the arithmetic process corresponding to the arithmetic exception is performed immediately. Thus the occurrence of the arithmetic exception can be handled without waiting for the final arithmetic result.

Moreover, when an arithmetic process corresponds to a floating-point multiplying process, the possibility that the arithmetic exception occurs can be judged based on the intermediate exponent obtained by adding the exponent of a multiplier factor by the exponent of a multiplicand. Thus, since the possibility in occurrence of the arithmetic exception is judged using the intermediate exponent, the process corresponding to the arithmetic exception (exponent overflow or exponent underflow) can be handled without waiting for the multiplied result of the mantissa part of a multiplier factor and the mantissa part of a multiplicand.

As described above in detail, in the arithmetic processing method and arithmetic processing device according to the present invention, the load of the dedicated arithmetic unit 31 can be reduced by executing an arithmetic process with the possibility of an arithmetic exception in another process in the middle of the arithmetic operation of the dedicated arithmetic unit 31. In addition, it is unnecessary to wait for the final arithmetic result and the number of logic stages used for the final arithmetic result can be reduced. As a result, the arithmetic process can be speeded up, whereby the arithmetic process time can be significantly reduced.

Occurrence of the arithmetic exception can be handled, without waiting for the final arithmetic result, by performing immediately an arithmetic control corresponding to the occurrence of the arithmetic exception at the time when it is judged that an arithmetic exception occurs certainly in the middle of the arithmetic process. Hence, this feature contributes to the high speed of the arithmetic process and a significant reduction of the arithmetic process time.

Moreover, in the floating-point multiplying process, the process corresponding to the arithmetic exception (exponent overflow or exponent underflow) can be performed quickly and certainly, without waiting for the multiplied result of the mantissa part of a multiplier factor and the mantissa part of a multiplicand, by judging the possibility that an arithmetic exception occurs based on the intermediate exponent obtained by adding the exponent of a multiplier factor to the exponent of a multiplicand.

Therefore, the floating-point multiplying process has the effect of realizing the reduced number of logic stages used for the final multiplied result, the high speed of the floating-point multiplication process, and the significantly-reduced processing time.

The embodiment of the present invention will be explained below by referring to the attached drawings.

Figure 3:
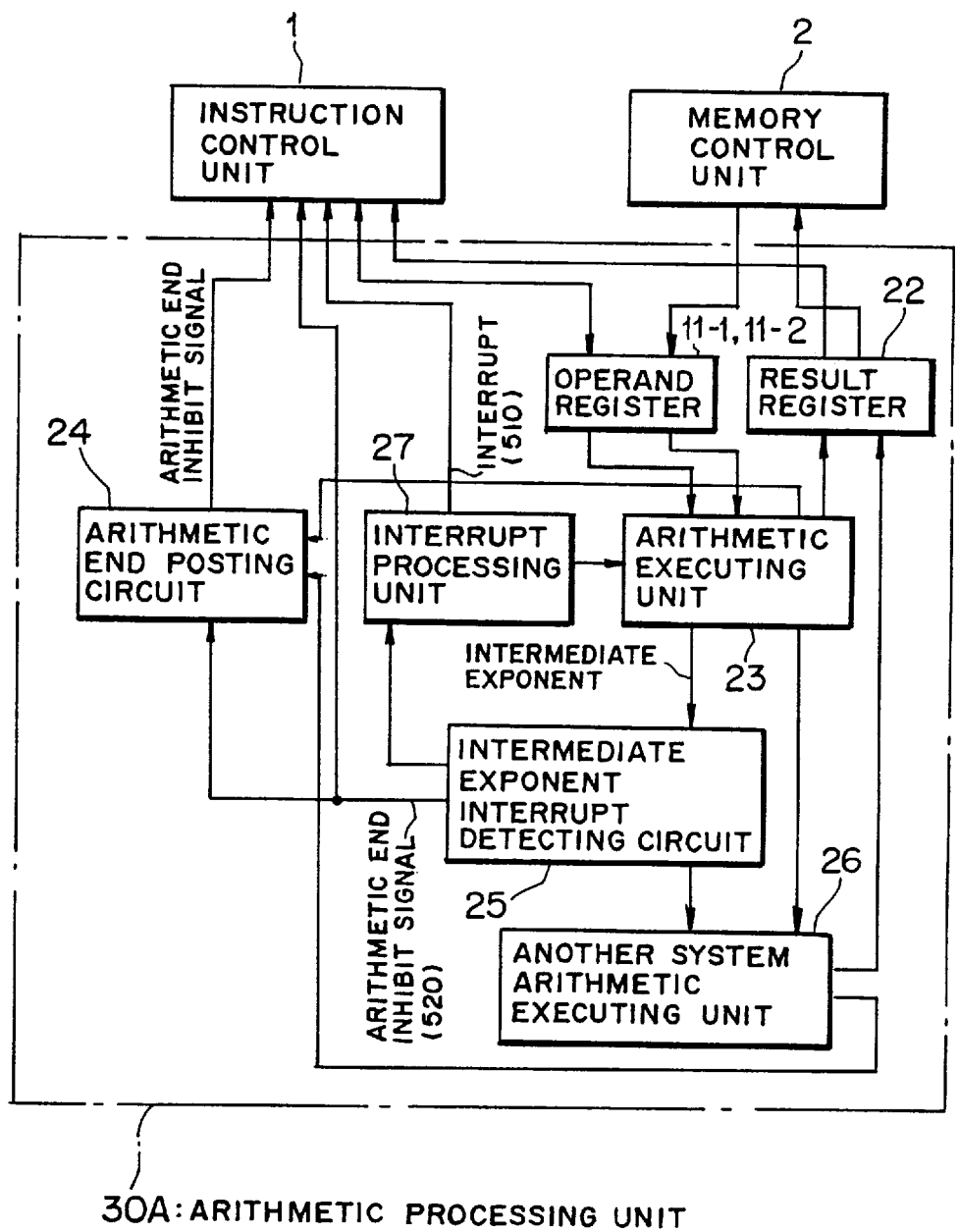
FIG. 3 is a block diagram showing the entire configuration of an arithmetic processing unit according to an embodiment of the present invention.

FIG. 3 is a block diagram illustrating the entire configuration of the arithmetic processing device according to an embodiment of the present invention. As shown in FIG. 3, the arithmetic processing device of the present embodiment performs an arithmetic operation in a pipeline mode. The arithmetic processing device includes an instruction control unit 1 which issues an arithmetic process instruction, an arithmetic processing unit 30A which executes an arithmetic process according to an arithmetic process instruction from the instruction control unit 1, and a memory control unit 2 which reads operand data out of a memory unit (not shown) to supply to the arithmetic processing unit 30A or writes an arithmetic result received from the arithmetic processing unit 30A to the memory unit.

Figure 5:
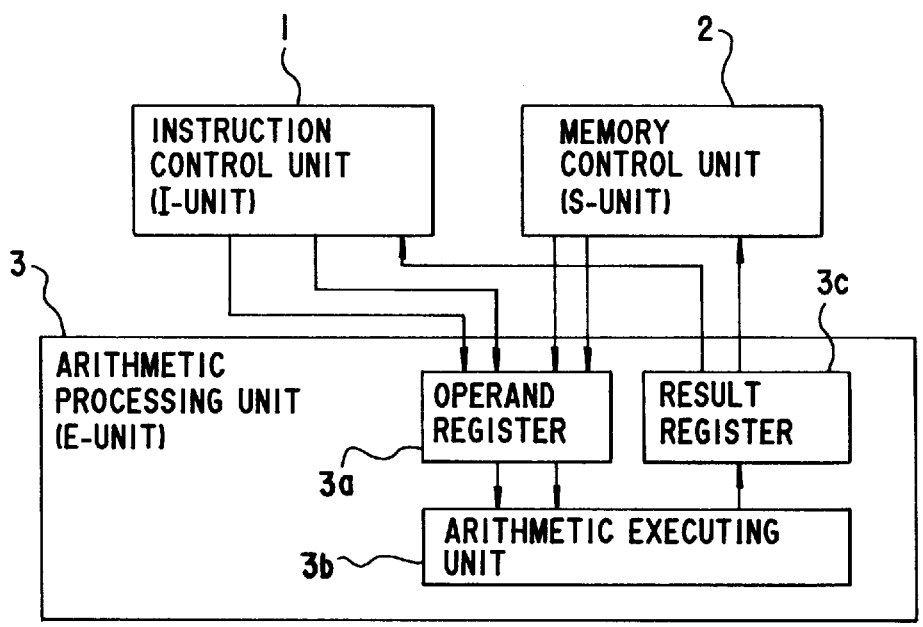
FIG. 5 is a block diagram illustrating a general information processing unit.
Figure 6:
FIG. 6 is a block diagram illustrating a general floating-point data format.

The instruction control unit 1 corresponds basically and functionally to the instruction control unit 1 shown in FIG. 5. The arithmetic processing unit 30A corresponds basically and functionally to the arithmetic processing unit 3 shown in FIG. 5. The memory control unit 2 corresponds basically and functionally to the memory control unit 1 shown in FIG. 5.

The arithmetic processing unit 30A according to the present embodiment, as shown in FIG. 3, is formed of operand registers 11-1 and 11-2, a result register 22, an arithmetic executing unit 23, an arithmetic end posting unit 24, an intermediate exponent interrupt detecting circuit 25, a different system arithmetic executing unit 26, and an interrupt processing unit 27.

Figure 7:
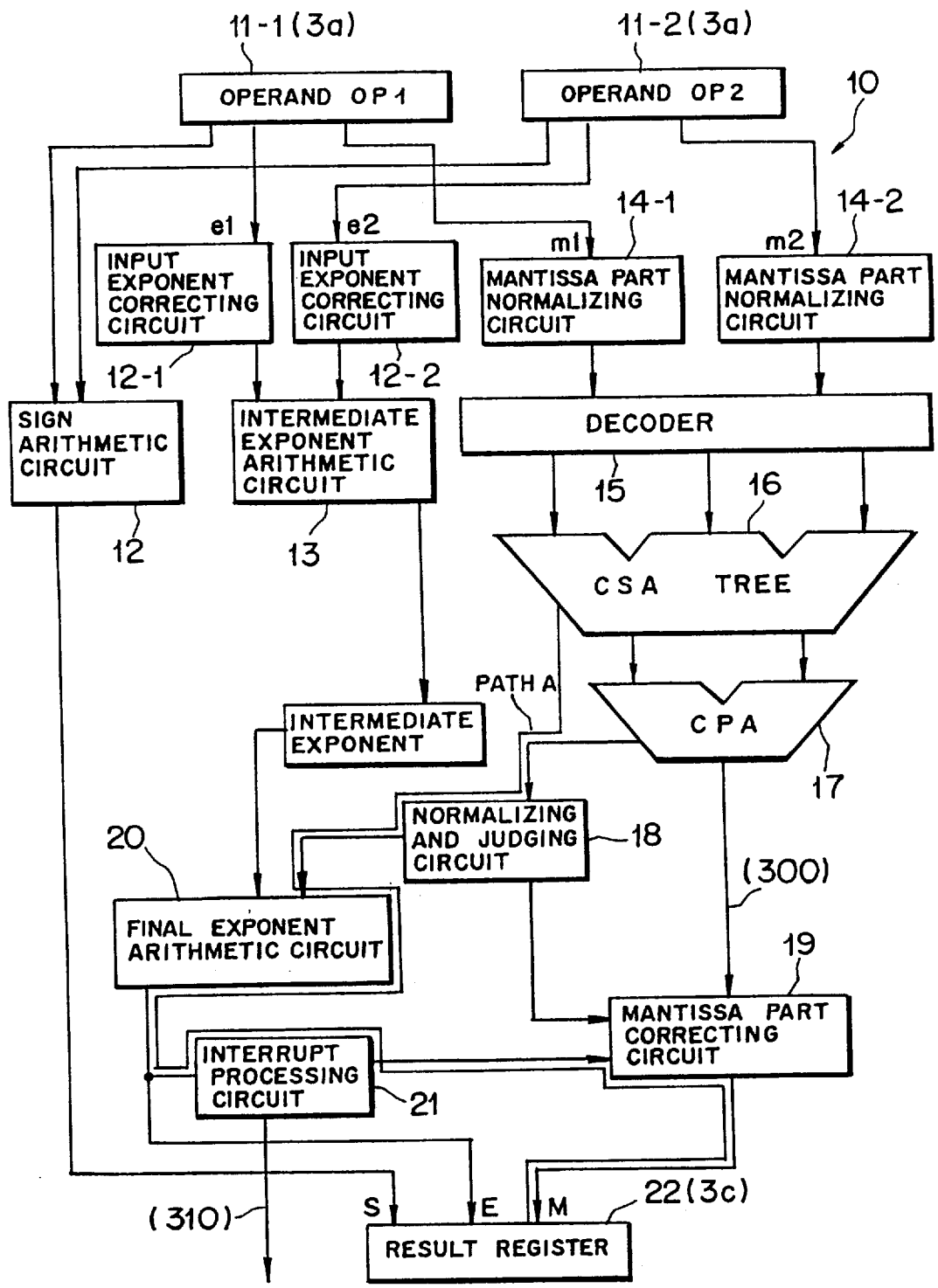
FIG. 7 is a block diagram illustrating the configuration of a general floating-point multiplier.

In the same manner as that shown in FIG. 7, the operand OP1 is set to the operand register 11-1 being a multiplicand or multiplier factor while the operand OP2 is set to the operand register 11-2 being a multiplicand or multiplier factor. In the same manner as that shown in FIG. 7, the multiplied result (including sign S, final exponent part E and final mantissa part M) of the operands OP1 and OP2 which are calculated by the arithmetic executing unit 23 or the different system arithmetic executing unit 26 (to be described) is written to the result register 22.

Figure 4:
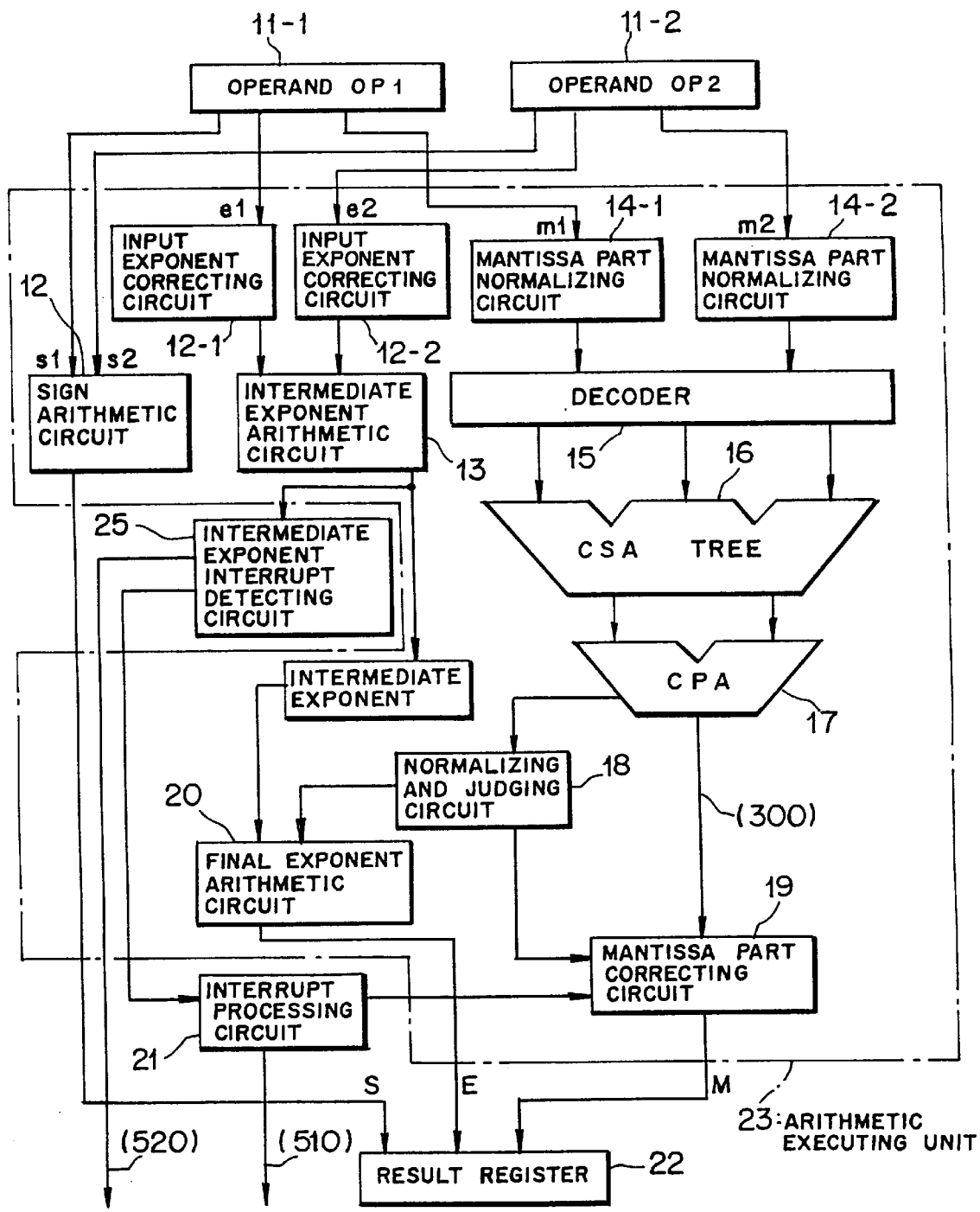
FIG. 4 is a block diagram showing the major portion of an arithmetic processing unit (floating-point multiplier) according to the present embodiment.

In the present embodiment, the arithmetic executing unit 23 is a dedicated arithmetic unit which functions as a floating-point multiplication processing unit (to be described by referring to FIG. 4).

(The arithmetic end posting circuit (arithmetic end posting unit) 24 transmits as an arithmetic end signal a notice signal representing the process completion in the final cycle of an arithmetic process to the instruction control unit 1 and reports the completion of the arithmetic process executed according to instructions from the instruction control unit 1.) As described above, the arithmetic end posting circuit 24 in the present embodiment uses as an arithmetic end signal the end notice signal of an arithmetic process of the arithmetic executing unit 23 to be effectively controlled in the pipeline mode.

The intermediate exponent interrupt detecting circuit 25 functions as a judging unit that judges the possibility that the arithmetic result obtained in an arithmetic process (multiplying process) of the arithmetic executing unit 23 produces an arithmetic exception (exponent overflow or exponent underflow) as well as that judges whether the arithmetic exception occurs certainly in the middle of the arithmetic process of the arithmetic executing unit 23. Particularly, the present embodiment performs a floating-point multiplying process as an arithmetic process. As described above, the intermediate exponent detecting circuit 25 judges the possibility (refer to FIG. 8) that the arithmetic exception occurs based on the intermediate exponent obtained by adding the exponent of a multiplier factor to the exponent of a multiplicand.

The intermediate exponent interrupt detecting circuit 25 has the function of transmitting an arithmetic end inhibiting signal (refer to (520) in FIG. 3) to the instruction control unit 1 when judging that there is the possibility that the arithmetic exception occurs ((2) and (4) shown in FIG. 8) and then reporting the operation. The intermediate exponent interrupt detecting circuit 25 also functions as an inhibiting unit that inhibits an arithmetic end signal from transmitting from the arithmetic end posting circuit 24 to the instruction control unit 1 till a different system arithmetic executing unit 26 executes completely an arithmetic process.

Where the intermediate exponent interrupt detecting circuit 25 judges that the possibility of the arithmetic exception occurs ((2) and (4) shown in FIG. 8), the different system arithmetic executing unit (different arithmetic unit) 26, different from the arithmetic executing unit 23, is arranged to execute the judged arithmetic process. In the present embodiment, the arithmetic executing unit 23 is designed only for the floating-point multiplying process to execute the floating-point multiplying process at the highest speed. The different system arithmetic executing unit 26 is activated by a interrupt routine in the case of the possibility of the arithmetic exception, and then executes the arithmetic process with the possibility of the arithmetic exception by using, for example, a microprogram.

(The interrupt processing circuit 27 functions as an arithmetic control unit that executes the arithmetic control (control of an interrupt process or correction of a multiplied result, as described later) corresponding to the occurrence of the arithmetic exception immediately when the intermediate exponent interrupt detecting circuit 25 judges that an arithmetic exception (exponent overflow or exponent underflow) occurs certainly ((1) or (5) in FIG. 8).)

The arithmetic executing unit 23 used only for a floating-point multiplication process, as shown in FIG. 4, consists of a sign arithmetic circuit 12, input exponent correcting circuits 12-1 and 12-2, intermediate exponent arithmetic circuit 13, mantissa part normalizing circuits 14-1 and 14-2, a decoder 15, a CSA TREE circuit 16, a CPA circuit 17, a normalizing and judging circuit 18, a mantissa part correcting circuit 19, and a final exponent arithmetic circuit 20. The arithmetic executing circuit 23 has nearly the same configuration as the internal configuration of the floating-point multiplying device 10 shown in FIG. 7. In FIG. 4, like numerals represent the same elements as those shown in FIG. 7. Hence, the detail explanation will be omitted here.

In the present embodiment, the intermediate exponent calculated by the intermediate exponent arithmetic circuit 13 is output to the intermediate exponent interrupt detecting circuit 25 in addition to the final exponent arithmetic circuit 20.

In the same one as the conventional manner, when the normalizing and judging circuit 18 judges that the normalization of the multiplied result (300) must be normalized, the mantissa part correcting circuit 19 normalizes the mantissa part multiplied result (300) from the CPA circuit 17 and then outputs the outcome as the final mantissa part M. In the present embodiment, the mantissa part correcting circuit 19 corrects the mantissa part multiplied result (300) according to the instruction from the interrupt processing circuit 27 as described above and then outputs the result as the final mantissa part M.

Moreover, the final exponent arithmetic circuit 20, shown in FIG. 7, outputs the final exponent part E as the arithmetic result to the interrupt processing circuit 21. In the present embodiment, it is not needed that the final exponent arithmetic circuit 20 outputs the final exponent part E to the interrupt processing circuit 27.

Japanese Laid-open Patent Publication (Tokkai-Hei) No. 2-71326 discloses the art in which the transmission of the arithmetic end signal is inhibited when the operand data supplied to the arithmetic processing device is not the object to be processed in an arithmetic operation, and an arithmetic operation is carried out in a different process based on the operand result.

According to the present invention, when it is judged that there is the possibility that a special post process (an interrupt process or correcting process accompanying the occurrence of an arithmetic exception) must be performed to the arithmetic result, provided that the operand data is to be processed by the arithmetic processing device in the middle of the arithmetic process, the arithmetic process with the possibility is specially executed in a different process (a different system arithmetic executing unit 26). Thus the number of logic stages (refer to the path A shown in FIG. 7) deciding the arithmetic process rate can be reduced. As a result, it is possible to increase the arithmetic process rate.

In the conventional floating-point multiplying method, the multiplied result of the mantissa part must be waited for to detect the exponent overflow or exponent underflow. Hence the large number of logic stages for the multiplied result leads to a decrease in the arithmetic process speed. However, according to the present embodiment, the intermediate exponent interruption detecting circuit 25 detects the exponent overflow or exponent underflow from the intermediate exponent, based on the relationship between the intermediate exponent and the interrupt occurrence shown in FIG. 8, without waiting for the multiplied result of the mantissa.

That is, when the intermediate exponent is smaller than "01000000" ((1) shown in FIG. 8), the exponent underflow occurs. When the intermediate exponent is smaller than "11000000" ((5) shown in FIG. 8), the exponent overflow occurs. Hence, when the intermediate exponent belongs to the ranges (1) or (5) shown in FIG. 8, the process is performed on the consideration that an arithmetic exception occurs without relating to the multiplied result of the mantissa part.

When the intermediate exponent is "01000000" ((2) in FIG. 8), or "11000000" ((4) in FIG. 8), the exponent overflow or exponent underflow may occur. However, this case is handled as a special case, as described above. The different system arithmetic executing unit 26 executes the arithmetic process as a different process.

Next, the floating-point multiplying process which is executed by the arithmetic processing device according to the present embodiment shown in FIGS. 3 and 4 will be explained below.

When the operand OP1 acting as a multiplier factor is set to the operand register 11-1 and the operand OP2 acting as a multiplicand is set to the operand register 11-2, the sign decimal multiplication can be made by adding the exponent part of the floating-point data OP1 to the exponent part multiplication of the floating-point data OP2 and by multiplying the mantissa part of the floating-point data OP1 by the mantissa part multiplication of the floating-point data OP2.

That is, in the exponent arithmetic operation, the intermediate exponent arithmetic circuit 13 adds the exponent part e1 of the operand OP1 to the exponent part e2 of the operand OP2 after the normalizing and collecting process. The addition result is handled as an intermediate exponent.

In the mantissa part arithmetic operation, after the mantissa part normalizing circuit 14-1 normalizes the mantissa part m1 of the operand OP1 and the mantissa part normalizing circuit 14-2 normalizes the mantissa part m2 of the operand OP2, the normalized mantissa parts m1 and m2 are subjected to a multiplication process by means of the decoder 15, the CSA TREE circuit 16 and the CPA circuit 17. When the normalizing and judging circuit 18 judges the necessity of normalizing the multiplied result (300), the mantissa part correcting circuit 19 normalizes the multiplied result (300), thus working out the final mantissa part M.

The final exponent arithmetic circuit 20 subtracts "64" being a bias component from the intermediate exponent. The mantissa part correcting circuit 19 normalize the multiplied result (300). In this case, the final exponent part E is calculated by further correcting the intermediate exponent by the normalization component.

In the present embodiment, the intermediate exponent worked out by the intermediate exponent arithmetic circuit 13 is input to the intermediate exponent interrupt detecting circuit 25. The intermediate exponent interrupt detecting circuit 25 checks for the value of the intermediate exponent. This checking operation is made according to the criteria (relationship between the intermediate exponent and interrupt occurrence) shown in FIG. 8.

When the checking results in "OBVIOUS RUPTURE" ((1) or (5) in FIG. 8), the interrupt processing circuit 27 reports an interruption (510) to the instruction control unit 1 by performing an interrupt process. Then the mantissa part correcting circuit 19 outputs the final mantissa part M normalized and corrected.

When the checking result of the intermediate exponent interrupt detecting circuit 23 is "DUBIOUS RUPTURE" ((2) or (4) in FIG. 8), the possibility of the arithmetic exception is reported by transmitting the arithmetic end inhibiting signal (520) from the intermediate exponent interrupt detecting circuit 23 to the instruction control unit 1. At this time, the arithmetic end inhibiting signal (520) is transmitted to the arithmetic end posting circuit 24. The different system arithmetic executing unit 26 inhibits transmitting an arithmetic end signal from the arithmetic end reporting circuit 24 to the instruction control unit 1 until the completion of arithmetic process. The arithmetic processing unit 30A executes an arithmetic process with the possibility that the arithmetic exception in the different process (different system arithmetic executing unit 26) occurs. Then the arithmetic process is completed by transmitting the arithmetic end signal from the arithmetic end reporting circuit 24 to the instruction processing unit 1.

As a result of checking the intermediate exponent interrupt detecting circuit 23, when the intermediate exponent belongs to the range (3) shown in FIG. 8, the arithmetic executing unit 23 executes the routine arithmetic process without an occurrence of the interruption to obtain the multiplied result. Then the multiplied result including the sign part S, the final exponent part E and the final mantissa part M is written in the result register 22.

As described above, according to an embodiment of the present invention, the intermediate exponent detecting circuit 25 judges the possibility that the arithmetic exception (exponent overflow or exponent underflow) occurs based on the intermediate exponent from the intermediate exponent arithmetic circuit 13. Then the different system arithmetic executing unit 26 executes an arithmetic process with an occurrence of the arithmetic exception in the middle of the arithmetic operation of the arithmetic excepting unit 23. As a result, the load of the arithmetic executing unit 23 can be reduced. Moreover, since it is not needed to have the multiplied result of the mantissa parts m1 and m2 and the number of logic stages needed for the final arithmetic result can be reduced, the floating-point multiplying process can be significantly performed at high speed, thus reducing the processing time.

Moreover, the arithmetic process can be shifted to the interrupt process corresponding to the occurrence of the arithmetic exception immediately at the time when it is judged that the arithmetic exception occurs certainly in the middle of the arithmetic process. Hence, the process corresponding to the arithmetic exception can be performed quickly and certainly without waiting for the multiplied result of the mantissa parts m1 and m2. As a result, since the significantly-reduced number of logic stages needed for the final multiplied result leads to the high speed of the floating-point multiplying process as well as the remarkably-reduced processing time.

In the above-mentioned embodiments, the case where the arithmetic process is a floating-point multiplying process has been explained. However, the present invention should not be limited only to the above-mentioned embodiments. The present invention is applicable to various arithmetic processes such as floating-point add-subtract process and can provide the same effect and function as those in the above-mentioned embodiments.

What is claimed is:

1. An arithmetic processing method in which a dedicated arithmetic unit executes an arithmetic process in which a pipeline mode according to an arithmetic processing instruction from an instruction control unit and then transmits an end notice signal of said arithmetic process as an arithmetic end signal to said instruction control unit, comprising of the steps of:

judging whether a possibility exists during said arithmetic process for an arithmetic exception to occur in an arithmetic result to be obtained from said arithmetic process;

inhibiting the arithmetic end signal from transmitting to the instruction control unit when said judging step judges that the possibility exits;

executing said arithmetic process with the possibility for the arithmetic exception to occur by another arithmetic unit different from said dedicated arithmetic unit; and transmitting the arithmetic end signal regarding said arithmetic process to said instruction control unit after completion of said executing step by arithmetic unit.

2. The arithmetic processing method according to claim 1, further comprising the step of executing immediately an arithmetic control when said judging step judges that the arithmetic exception will clearly occur during the arithmetic process.

3. The arithmetic processing method according to claim 1, wherein said judging step judges whether the possibility for the arithmetic exception to occur exists according to an intermediate exponent obtained by adding an exponent of a multiplier factor by an exponent of a multiplicand when said arithmetic process corresponds to a floating-point multiplying process.

4. The arithmetic processing method according to claim 1, wherein said judging step judges whether the possibility for the arithmetic exception to occur exists according to an intermediate exponent obtained by adding an exponent of a multiplier factor by an exponent of a multiplicand when said arithmetic process corresponds to a floating-point multiplying process.

5. An arithmetic processing device comprising:

an instruction processing unit issuing an arithmetic processing instruction; and an arithmetic processing unit executing an arithmetic process in a pipeline mode according to an arithmetic processing instruction from said instruction control unit, said arithmetic processing unit including:

a dedicated arithmetic unit executing said arithmetic process;

an arithmetic end posting unit transmitting an end notice signal in said arithmetic process as an arithmetic end signal to said instruction control unit;

a judging unit judging whether a possibility exists during said arithmetic process for an arithmetic exception to occur in an arithmetic result to be obtained by said arithmetic process;

another arithmetic unit, different from said dedicated arithmetic unit, executing said arithmetic process when said judging unit judges that the possibility for the arithmetic exception to occur exists; and inhibiting unit inhibiting the arithmetic end signal from transmitting from said arithmetic end posting unit to said instruction control unit till said another arithmetic unit completes said arithmetic process when said judging unit judges that the possibility for the arithmetic exception to occur exists.

6. The arithmetic processing device according to claim 5, wherein said arithmetic processing unit further comprises an arithmetic control unit immediately executing an arithmetic control when said judging unit judges that the arithmetic exception will clearly occur during said arithmetic process.

7. The arithmetic processing device according to claim 5, wherein said judging unit judges whether the possibility for the arithmetic exception to occur exists according to an intermediate exponent obtained by adding the exponent of a multiplier factor by the exponent of a multiplicand when said arithmetic process corresponds to a floating-point multiplying process.

8. The arithmetic processing device according to claim 6, wherein said judging unit judges whether the possibility for the arithmetic exception to occur exists according to an intermediate exponent obtained by adding the exponent of a multiplier factor by the exponent of a multiplicand when said arithmetic process corresponds to a floating-point multiplying process.

* * * * *